United States Patent [19]

Lin

[11] Patent Number: 5,566,970

[45] Date of Patent: Oct. 22, 1996

[54] CAR AUTOMATIC BALANCE DEVICE

[76] Inventor: Chiou D. Lin, 12-6, Tien Hsin Alley, Yea Tan Road, Ta Yea Hsiang, Taichung Hsien, Taiwan

[21] Appl. No.: 439,772

[22] Filed: May 12, 1995

[51] Int. Cl.$^6$ ................................................ B60G 31/073
[52] U.S. Cl. ...................... 280/689; 280/709; 280/112.1; 267/186
[58] Field of Search .................... 280/772, 689, 280/709, 710, 702, 112.1, 6.11, 6.12, 755; 267/186, 64.16

[56] References Cited

U.S. PATENT DOCUMENTS

| | | | |
|---|---|---|---|
| 3,090,611 | 5/1963 | Schultze | 280/112.1 |
| 3,328,019 | 6/1967 | Wilson | 267/186 |
| 3,563,566 | 2/1971 | Weber | 280/702 |
| 3,871,635 | 3/1975 | Unruh et al. | 267/64.16 |

FOREIGN PATENT DOCUMENTS

93/01063   1/1993   WIPO ................................. 280/709

*Primary Examiner*—Anne Marie Boehler
*Assistant Examiner*—Peter C. English
*Attorney, Agent, or Firm*—Bacon & Thomas

[57] ABSTRACT

A synchronous balance device to maintain a car body balanced without inclination due to eccentric force during turning, and to offset eccentric forces during turning, and to offset eccentric forces to increase safety. Two sets of two hydraulic cylinders are mounted on left and right sides between the car body and axle. An oil feed port on one left hydraulic cylinder communicates with an oil discharge port on a right hydraulic cylinder, and an oil discharge port on the other left hydraulic cylinder communicates with an oil feed port on the other right hydraulic cylinder. When the car body is inclined with one side rising and the other side sinking piston rods of the hydraulic cylinders on the rising side pull down the car body to keep it balanced. Therefore, the present invention enables a car body to keep from becoming inclined during turning so as to increase driving safety.

4 Claims, 5 Drawing Sheets

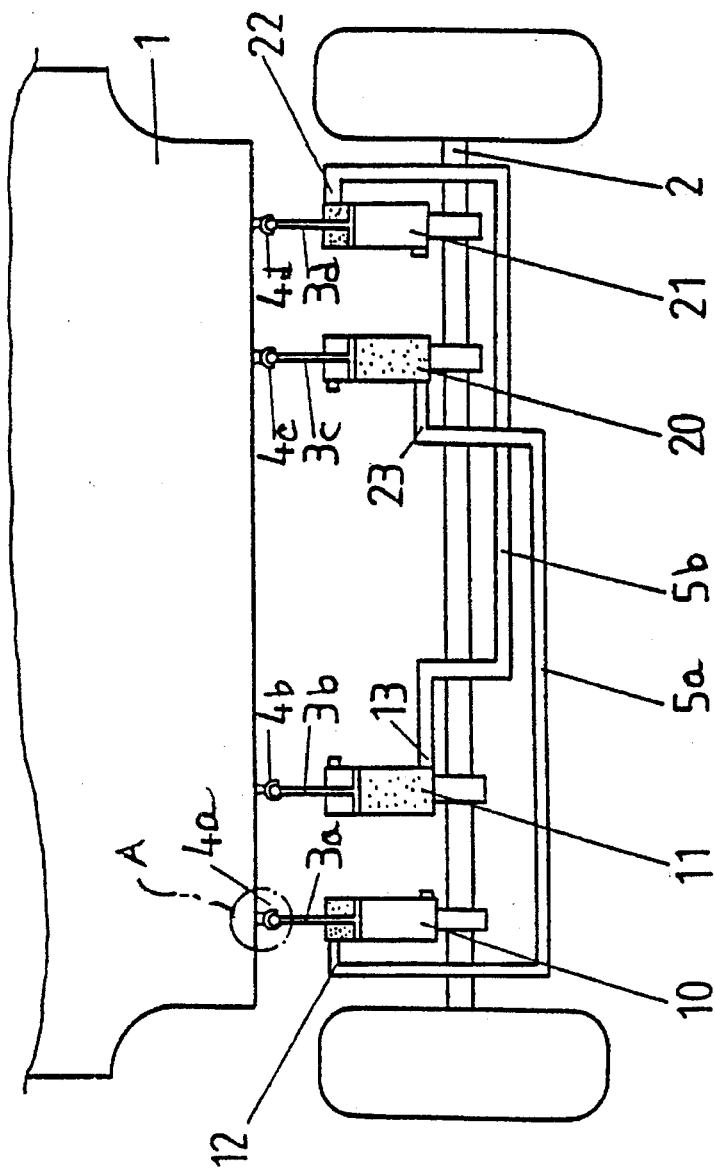
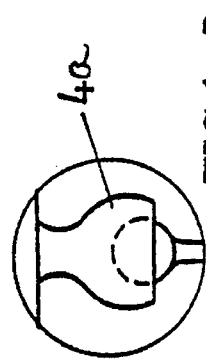
FIG.1(A)
FIG.1(B)

CAR AUTOMATIC BALANCE DEVICE

BACKGROUND OF THE INVENTION

The present invention relates to an automatic car balance device, and particularly to a synchronous action balance device for a car, which enables the car body to correct an inclination when an eccentric force is produced due to the car turning, so as to increase driving safety.

It is commonly known that an eccentric force will be produced when a car turns (especially a sharp turn), and because of such eccentric force, the car body will roll or become inclined. Such "eccentric force" and "inclination" will cause passengers to feel uncomfortable, or to be injured in a collision. Worse, the car might overturn and run off the road. At present such problem has no solution, although some have added a balance bar which is a metal connection bar between the wheels on both sides to restrain the inclination. However, the result is limited because of fixed restraint.

SUMMARY OF THE INVENTION

The inventor therefore has developed the present synchronous action balance device for a car through research and testing, which overcomes the problem of eccentric force and car body inclination, enabling the car to keep both sides balanced when either side is rising or sinking during turning, and further to offset the eccentric force while increasing driving safety.

These and other objects and advantages of the present invention will become apparent to those skilled in the art after considering the following detailed specification together with the accompanying drawings.

BRIEF DESCRIPTION OF THE DRAWINGS

FIG. 1A is a schematic diagram of a preferred embodiment of the present invention.

FIG. 1B is an enlarged view of area A in FIG. 1A.

DETAILED DESCRIPTION OF PREFERRED EMBODIMENTS

Figure 2:
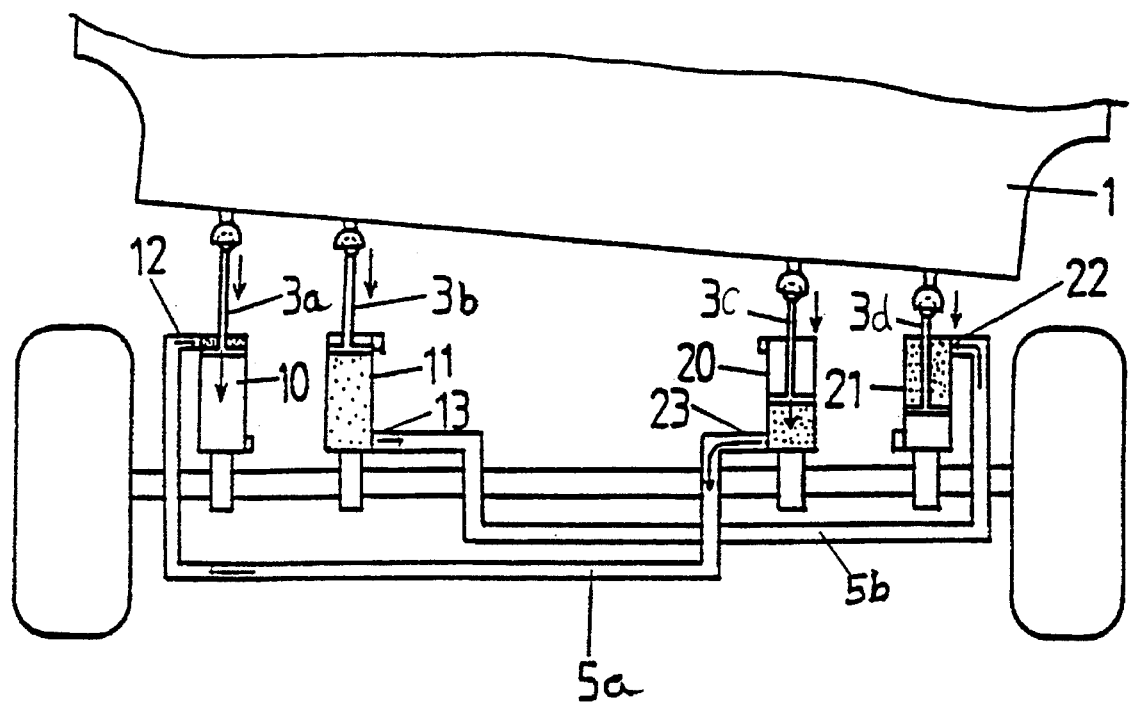
FIG. 2A is a diagram of a car turning left.
FIG. 2B is a diagrammatic view showing the balancing action of the invention for a left inclination of a car body when turning left as shown in FIG. 2A.
Figure 2:
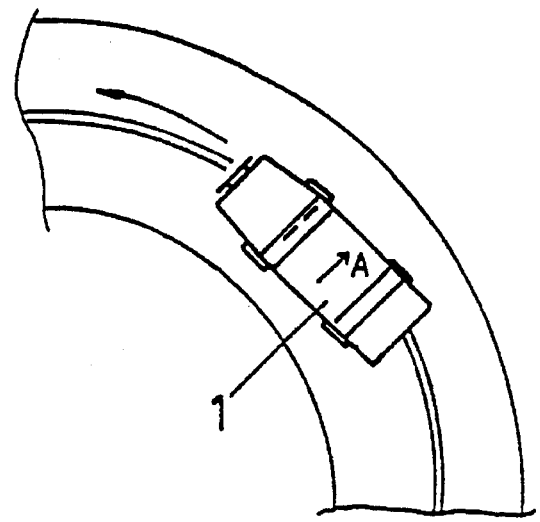

Referring to FIG. 1, four hydraulic cylinders 10, 11, 20, 21 in two sets have a universal connector 4a–4d for mounting on the car body 1 and axle 2, one set of hydraulic cylinders 10, 11 being mounted on the left side of the car, another set 20, 21 being mounted on the right side. Oil feed port 12 on the left hydraulic cylinder 10 communicates with oil discharge port 23 on the right hydraulic cylinder 20 by means of oil pipe 5a, and oil discharge port 13 on the left hydraulic cylinder 11 also communicates with oil feed port 22 on the right hydraulic cylinder 21 by means of oil pipe 5b to form a hydraulic loop.

When the car body 1 turns left (FIG. 2A), eccentric force A will cause inclination of car body 1 with the left side rising and the right side sinking. Downward pressure will cause the piston in the right hydraulic cylinder 20 to push down to force the oil within the hydraulic cylinder 20 to feed into the oil feed port 12 on the left hydraulic cylinder 10 by means of oil discharge port 23, thereby causing the piston in the left hydraulic cylinder 10 to pull-down piston rod 3a to pull down the car body 1. Because the right side of the car body is sinking, an oil suction is produced to cause the oil within the left hydraulic cylinder 11 to pass through the oil discharge port 13 into the right hydraulic cylinder 21, enabling the piston rod 3b on the left hydraulic cylinder 11 to move down to help pull down the car body 1. With the aforesaid functions, the synchronous action with a left turn of the car body will keep the left side of the car body from rising and offset the eccentric force.

Figure 3B:
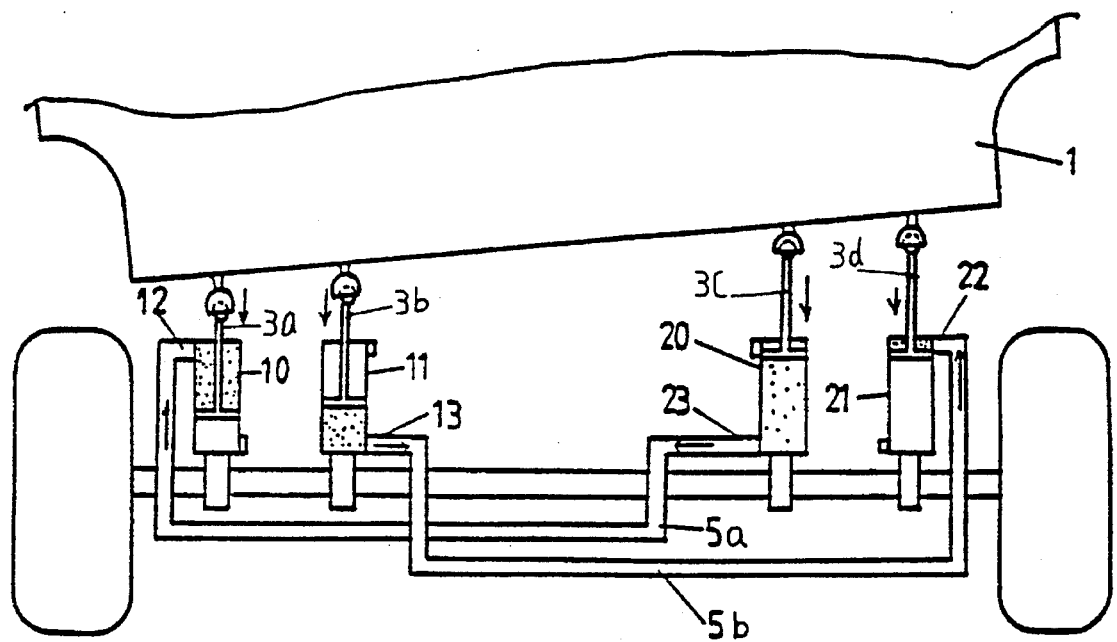
FIG. 3B is a diagrammatic view showing the balancing action of the invention for a right inclination of a car body when turning right as shown in FIG. 3A.
Figure 3A:
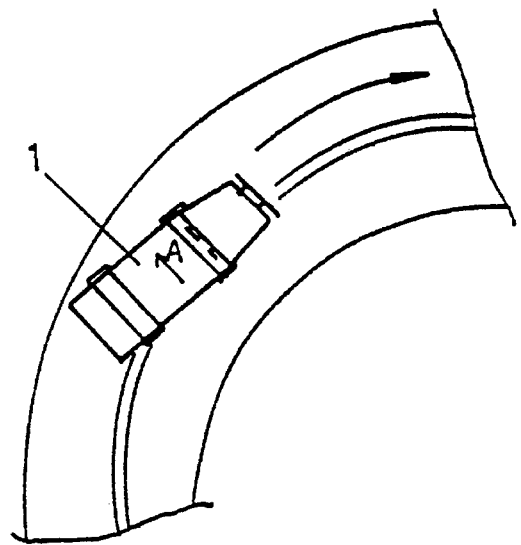
FIG. 3A is a diagram of a car turning right.

Accordingly, when the car body 1 turns right (FIG. 3A), the car body 1 inclines with the right side rising and the left side sinking. The downward pressure will cause the piston of the left hydraulic cylinder 11 to push down to enable the oil within the hydraulic cylinder 11 to feed into the oil feed port 22 on the right hydraulic cylinder 21 by means of oil discharge port 13, to cause the piston of the right hydraulic cylinder 21 to exert pull-down force on piston rod 3d to pull down the car body 1. Oil suction is also produced to cause the oil within the right hydraulic cylinder 20 to be sucked into the left hydraulic cylinder 10, enabling the piston rod 3c on the right hydraulic cylinder 20 to pull down the body 1. The synchronous action with a right turn of the car body will keep the car body from inclining to maintain balance without inclination.

Figure 4:
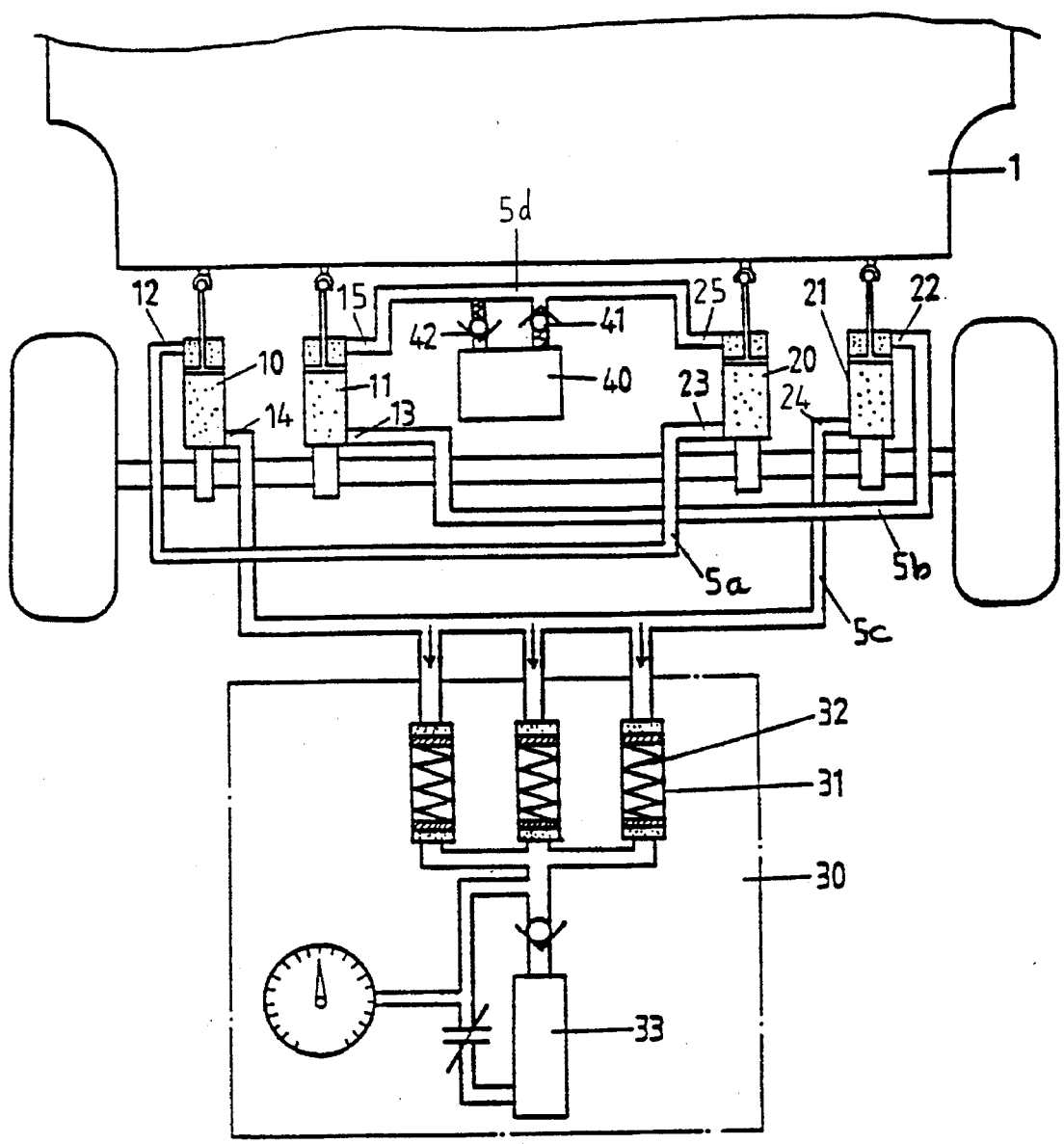
FIG. 4 is another embodiment of the present invention.
Figure 5:
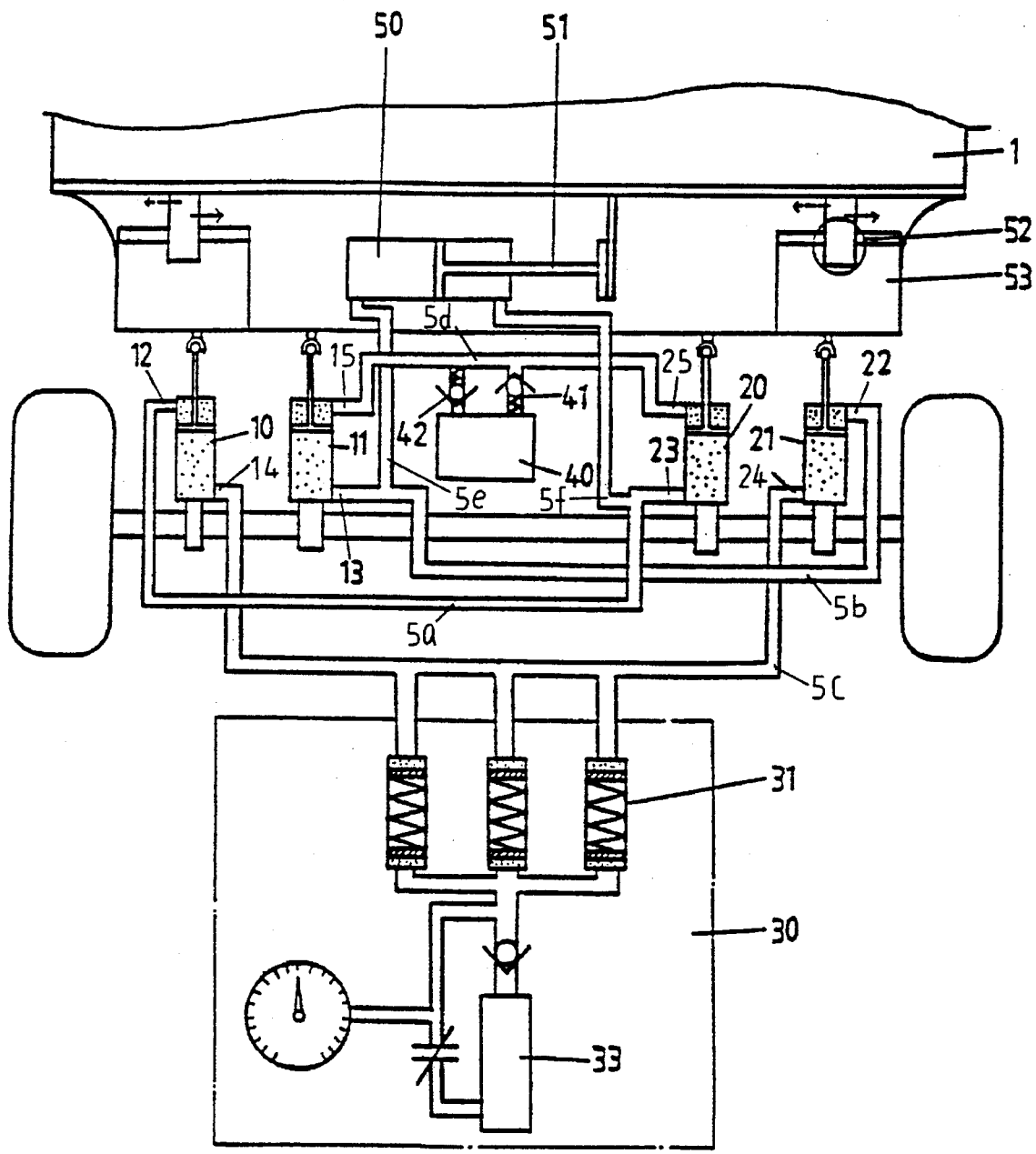
FIG. 5 is an embodiment showing the mounting of a horizontal sensing hydraulic cylinder on the car body according to the present invention.

According to the aforesaid principle and techniques, in order to increase the shock absorption of the car body 1 on an uneven road, a shock-absorber 30 (FIG. 4) may be used. Said shock-absorber 30 comprises an oil sump 33 connected to three hydraulic cylinders 31, each having a spring 32. The oil loop is the same as FIG. 1, and oil discharge ports 14, 24 on the left and right hydraulic cylinders 10, 21 are connected to the shock-absorber hydraulic cylinders 31 of the shock-absorber 30 respectively by oil pipe 5c. The oil feed ports 15, 25 of the left and right hydraulic cylinders 11, 20 are connected to an oil sump 40 by oil pipe 5d. When the car body 1 is pushing down on an uneven road, oil will be discharged from the oil discharge valve 42 into the left and right hydraulic cylinders 11, 20, and an action force will be sustained by the hydraulic cylinders 31. The oil within the left and right hydraulic cylinders 11, 20 may enter the oil sump 40 by means of oil pressure valve 41 for a buffer force for the control over the car body when rising, and the oil sump 33 of the shock-absorber 30 is provided for adjusting resilience of the hydraulic cylinders 31, which may adjust shock absorber pressure subject to the weight load of the car, enabling the car to be more stable and comfortable.

In order to increase the turning response, the present invention may connect the car body 1 with the chassis 53 by means of a slide seat 52. The car body 1 is integrally mounted with a horizontal sensing hydraulic cylinder 50 having a piston rod 51, and oil discharge ports 13, 23 on the left and right hydraulic cylinders 11, 20 communicate with cylinder 50 by means of oil pipes 5e, 5f. When the car turns left, (FIG. 2A), oil will be discharged from the right side of horizontal sensing hydraulic cylinder 50 into the discharge port 23 on the right hydraulic cylinder 20, and the feed port 12 on the left hydraulic cylinder 10 to help sense and correct the inclination of the car body 1. On the contrary, when the car turns right, oil will be discharged from the left of horizontal sensing hydraulic cylinder 50 into the right and left hydraulic cylinders 11, 21 to help balance the car body.

I claim:

1. A vehicle stabilizing system for a vehicle having a body and an axle, comprising:
   a) first and second left hydraulic cylinders mounted between a left side of the body and a left side of the axle;
   b) first and second right hydraulic cylinders mounted between a right side of the body and a right side of the axle;
   c) a first conduit connecting an oil feed port on the first left hydraulic cylinder to an oil discharge port on the first right hydraulic cylinder; and
   d) a second conduit connecting an oil discharge port on the second left hydraulic cylinder to an oil feed port on the second right hydraulic cylinder, thereby forming a hydraulic loop between the first and second left, and first and second right hydraulic cylinders.

2. The vehicle stabilizing system of claim 1 further including a shock absorber system comprising:
   a) an oil sump;
   b) at least one shock absorber hydraulic cylinder connected to the oil sump; and,
   c) a third conduit connecting the at least one shock absorber hydraulic cylinder to an oil discharge port on the first left hydraulic cylinder and an oil discharge port on the second right hydraulic cylinder.

3. The vehicle stabilizing system of claim 2 further comprising a plurality of shock absorber hydraulic cylinders each connected to the oil sump and the third conduit.

4. The vehicle stabilizing system of claim 1 wherein the vehicle includes a chassis to which the first and second left and right hydraulic cylinders are connected and to which the vehicle body is mounted, further comprising:
   a) a horizontal sensing hydraulic cylinder mounted between the chassis and the body;
   b) a fourth conduit connecting a first side of the horizontal sensing cylinder to the oil discharge port of the second left hydraulic cylinder; and,
   c) a fifth conduit connecting a second side of the horizontal sensing cylinder to the oil discharge port of the first right hydraulic cylinder.

* * * * *